(12) United States Patent
Gasdick et al.

(10) Patent No.: US 11,789,725 B2
(45) Date of Patent: Oct. 17, 2023

(54) MODULAR ELECTRONIC WARFARE FRAMEWORK FOR MULTI-CORE EXECUTION

(71) Applicant: BAE Systems Information and Electronic Systems Integration Inc., Nashua, NH (US)

(72) Inventors: Charles C. Gasdick, Milford, NH (US); Daniel B. Harrison, Litchfield, NH (US); Michael F. Roske, Milford, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 474 days.

(21) Appl. No.: 17/170,311

(22) Filed: Feb. 8, 2021

(65) Prior Publication Data
US 2022/0253309 A1 Aug. 11, 2022

(51) Int. Cl.
*G06F 9/46* (2006.01)
*G06F 8/76* (2018.01)
*G06F 9/448* (2018.01)
*G06F 9/52* (2006.01)

(52) U.S. Cl.
CPC .............. *G06F 8/76* (2013.01); *G06F 9/449* (2018.02); *G06F 9/52* (2013.01)

(58) Field of Classification Search
CPC .............. G06F 8/76; G06F 9/449; G06F 9/52
See application file for complete search history.

*Primary Examiner* — Gregory A Kessler
(74) *Attorney, Agent, or Firm* — Sand, Sebolt & Wernow LPA

(57) ABSTRACT

A modular electronic warfare (EW) framework that is implemented into a first preexisting EW system with associated hardware and firmware to leverage the capabilities of the first preexisting EW system into a second, different preexisting EW system with associated hardware and firmware. The modular EW framework includes a tracking framework and a logic framework. The tracking framework is configured to receive a first set of objects from a preexisting EW system and augments the first set of objects with at least one parameter and outputs the second set of objects. The logic framework is configured to receive the set of second objects from the tracking framework and implements at least one process onto the second set of objects and outputs a third set of objects. A multi-core processor is used to operate the modular EW framework. The multi-core processor is configured to execute the at least one parameter to output the second set of objects and configured to execute the at least one process to output the third set of objects The first set of objects in the fixed EW system remains unaffected within the fixed EW system. The first set of objects is different than the second and third sets of objects. The modular EW framework is also platform-agnostic and can be implemented with a broad suite of computer processing units and operating systems. Each of the tracking framework and the logic framework of the modular EW framework are asynchronous.

20 Claims, 4 Drawing Sheets

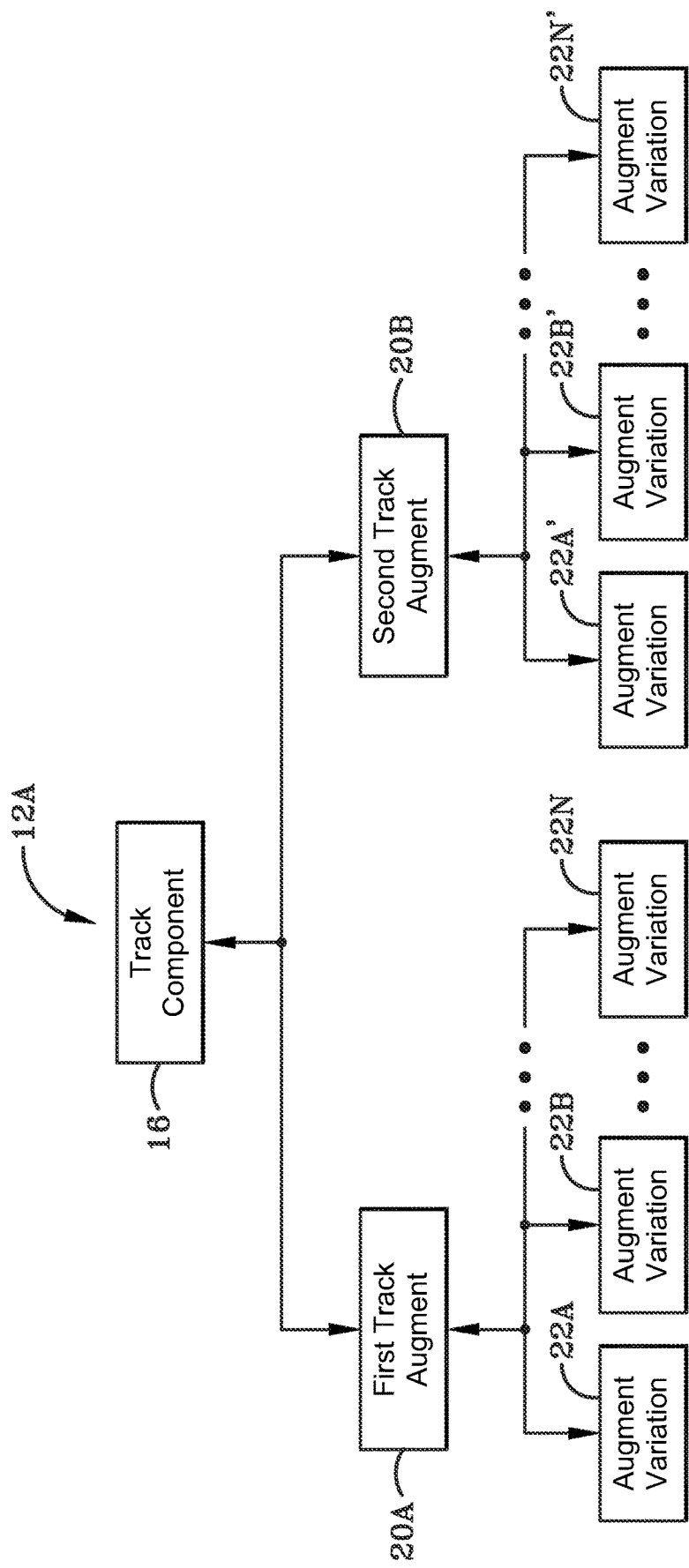

MODULAR ELECTRONIC WARFARE FRAMEWORK FOR MULTI-CORE EXECUTION

TECHNICAL FIELD

The present disclosure relates to electronic warfare (EW) systems. More particularly, the present disclosure relates to leveraging EW systems through a modular EW framework. Specifically, the present disclosure relates to leveraging EW systems through a modular EW framework with multi-core processing execution while eliminating the need to update hardware and/or firmware in preexisting EW systems.

BACKGROUND

Electronic warfare (EW) software solutions are tightly intertwined with specific dependencies on EW hardware and firmware, unique EW programs, and EW system designs. Given this intertwinement between EW software and corresponding EW components and programs, the conventional EW systems in the art pose issues for future development and expansion at a relatively low economic cost and at a relatively low risk of error for developing and testing EW systems.

One issue that occurs in the conventional EW systems is the ability to scale such an EW system. The conventional EW systems used in the market today are economically expensive when trying to scale such an EW architecture from a small form factor solution to a large, complex form factor solution. The needed requirements to scale such an EW system requires a sufficient amount of time to develop and test, which, inevitably, drives higher costs to produce such an EW system. Another issue for conventional EW systems is the ability to leverage and/or enhance the EW software solutions to other platforms, such as leveraging the software operational flight programs (OFPs) between different vehicle platforms. Similarly, the necessary requirements to leverage such an EW system requires a sufficient amount of time to develop and test, which, inevitably, drives higher costs to produce such an EW system.

By having a greater amount of update requirements or new designs for an EW software solution, the more software sources and tests must be updated. Such updates or new software designs cause extended timeframes for integrating the EW software solution into the EW components and programs and testing the EW software solution in the EW components and programs. Furthermore, the integration and testing of this EW software solution is typically performed in a system integration lab, which, if defects occur during such integration and testing, such defects are economically expensive to repair.

SUMMARY

Based on the conventional technology and current problems in the field of updating and leveraging preexisting EW systems, an improvement is needed.

In one aspect, an exemplary embodiment of the present disclosure may provide a system that comprises of a fixed electronic warfare (EW) system, a modular EW framework, and a multi-core processor. The fixed electronic warfare (EW) system has an executable code and at least one sensor unit that is configured to gather a first set of data. The executable code and the first set of data collectively define a first set of objects. The modular EW framework is configured to extract the first set of objects from the fixed EW system. The modular EW framework modifies the first set of objects with at least one parameter to output a second set of objects. The multi-core processor is configured to execute the at least one parameter to output the second set of objects. The first set of objects in the fixed EW system remains unaffected within the fixed EW system. The first set of objects is different than the second set of objects.

In another aspect, an exemplary embodiment of the present disclosure may provide a system that comprises of a fixed electronic warfare (EW) system, a modular EW framework, and a multi-core processor. The fixed electronic warfare (EW) system has an executable code and at least one sensor unit configured to gather a first set of data. The executable code and the first set of data collectively define a first set of objects. The modular EW framework has a tracking framework and a logic framework. The tracking framework is configured to receive the first set of objects from the fixed EW system. The tracking framework augments the first set of objects with at least one parameter and outputs the second set of objects. The logic framework is configured to receive the set of second objects from the tracking framework, the logic framework implements at least one process onto the second set of objects and outputs a third set of objects. The multi-core processor is configured to execute the at least one parameter to output the second set of objects. The first set of objects in the fixed EW system remains unaffected within the fixed EW system. The first set of objects is different than the second and third sets of objects.

In yet another aspect, an exemplary embodiment of the present disclosure may provide a method for leveraging a fixed electronic warfare (EW) system with a modular electronic warfare (EW) application framework. The method includes the following steps: outputting, by a fixed electronic warfare (EW) system having an executable code and at least one sensor unit gathering data, a first set of objects; augmenting, by a tracking framework, the set of objects with at least one parameter to obtain a second set of objects; and calculating, by a logic framework, the second set of objects with at least one process to obtain a third set of objects.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 2A illustrates an alternative block diagram of the tracking framework shown in FIG. 1.

Similar numbers refer to similar parts throughout the drawings.

DETAILED DESCRIPTION

The term "fixed" in the context of this disclosure relates to any and all preexisting or established EW hardware (e.g., sensors, computers, etc.) and firmware disposed in a preexisting EW system that is configured on a vehicle, platform or other suitable locations for an EW system. In addition, the term "fixed" in the context of this disclosure relates to the executable programs of preexisting EW systems remaining unchanged and/or unaffected by any implementation and integration of additional components, such as a modular EW framework. As such, the executable programs and the components of the "fixed" EW system retrain the same features and characteristics at the initial time of implementing the EW system into a vehicle, platform or other suitable location for implementing such an EW system.

Figure 1:
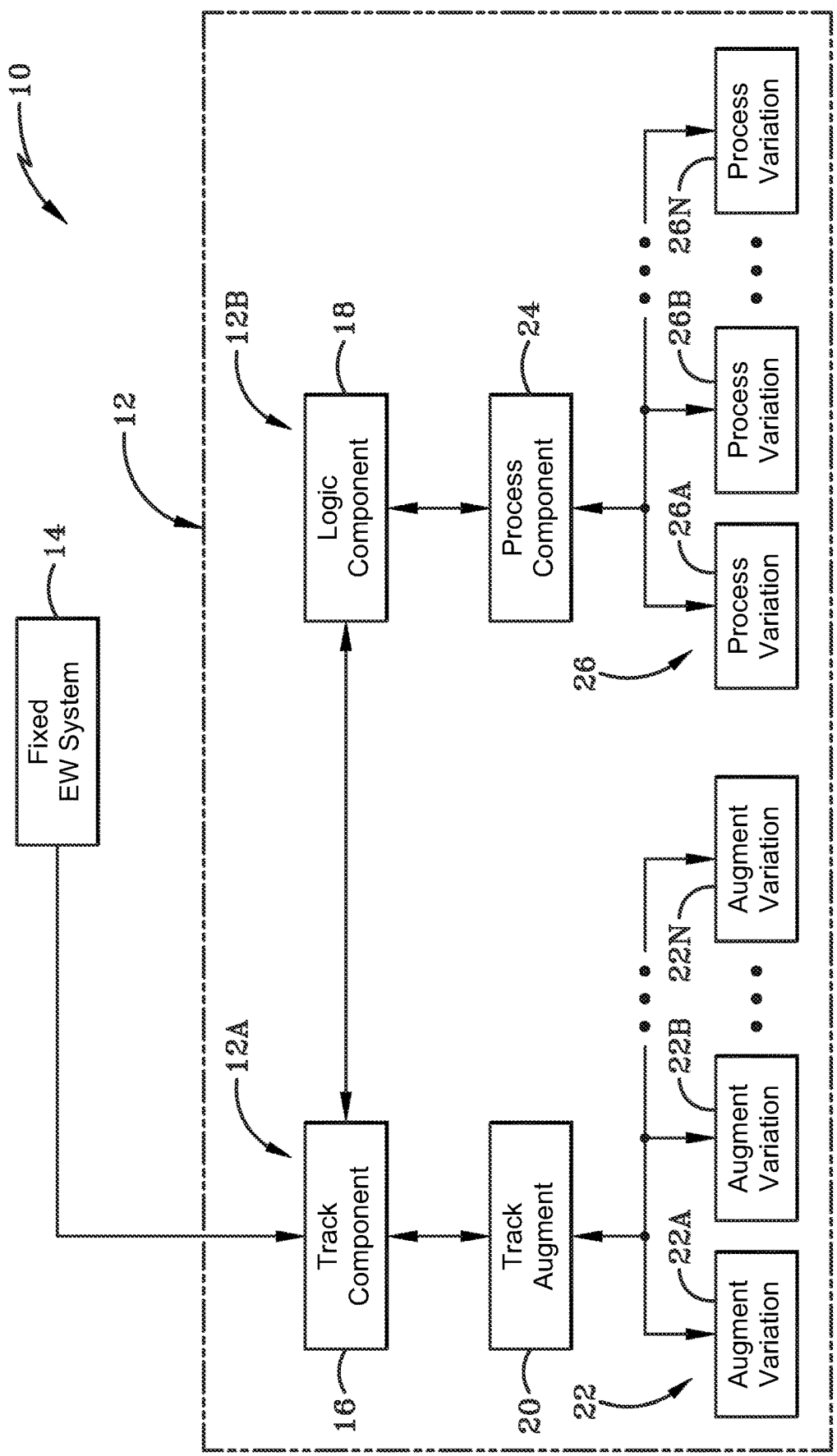
FIG. 1 illustrates a block diagram of a modular EW framework implemented into a fixed (EW) system.

FIG. 1 illustrates a block diagram of a system 10 that includes a modular electronic warfare (EW) framework 12 (referred to as "modular EW 12" herein) implemented into an existing, fixed EW system 14. In the illustrated embodiment, the modular EW 12 is a mechanism that may store, update, maintain, and expand on electronic warfare information in separate, isolated objects and methods/processes. Such mechanism may provide a high level of maintainability, testability, and extensibility while affording a high quality, quickly produced deliverable solutions and configuration for fixed EW systems, like fixed EW system 14, and the EW domain.

In the illustrated embodiment, the modular EW 12 includes two different frameworks, a tracking framework 12A and a logic framework 12B. The tracking framework 12A is a mechanism that organizes and affixes technical data (e.g., augments) to a track object (e.g., an emitter or track) in a modular and maintainable method. This technical data organized and affixed by the tracking framework 12A is refined and updated via the logic framework 12B. The logic framework 12B is a mechanism that organizes and executes specific electronic warfare and associated processes in an isolated and asynchronous method. The processes would typically refine and update the information associated with the track objects. However, in one exemplary embodiment, the processes are not required to perform such refinement and updates. Each of the tracking framework 12A and the logic framework 12B may be implemented into the fixed EW system 14 individually or in association with each other, which is described in more detail below.

In the illustrated embodiment, the EW system 14 is a fixed EW system utilized in a vehicle, platform or in other suitable embodiments for locating and operating an EW system. In general, the fixed EW system 14 includes executable codes and associated hardware and/or firmware that are used during operation of the EW system to gather and employ specific data, such as radio frequency data, geolocation data, and other similar data collected in an EW system. Additionally, the fixed EW system 14 stores collected data and code, which, collectively, may be known as objects stored in the fixed EW system 14. The objects are track object themselves, which may also contain the set of augments that organize and refine the data. For example, a track object, itself, may only contain an identifier and a time or other non-pertinent meta data. However, the track object lists (from zero to a plurality of items) of track information augments will contain, and organize, data that has been discovered, refined, and updated over time on this specific track. Examples of such objects provided by a fixed EW system and sent to a modular EW framework include primitive radiofrequency ("RF") information, advanced RF metrics, associated pulses, signal(s) of interest, geolocation information, correlation data, emitter identification, and other similar objects that a fixed EW system may send to a modular EW framework The modular EW 12 is implemented into the fixed EW system 14. Initially, in the illustrated embodiment, the tracking framework 12A is in communication with the fixed EW system 14 to receive the first set of objects from the EW system 14. As illustrated in FIG. 1, the modular EW 12 includes a tracking framework 12A that defines a track component 16. The track component 16 is an entity within the tracking framework 12A that the fixed EW system 14 is currently aware of as the modular EW 12 is implemented into the fixed EW system 14. As such, the track component 16 is the data track or track information that is being sent from at least one device included in the fixed EW system 14. Such data track or track information examples for a track component 16 are explained above. The track component 16 includes a plurality of track augments 20 that the track component 16 calls upon when the tracking component receives the first set of objects from the fixed EW system 14. Each track augment of the plurality of track augments 20 is a data track or track information from the track component 16. Each track augment of the plurality track augments 20 is an interface that allows a user, such as a system developer, to develop and/or modify each track augment in the plurality of track augments 20, which is described in more detail below. Each track augment in the plurality of track augments 20 provides a command and/or an instruction as to how the track component 16 may augment and/or organize the incoming first set of objects from the fixed EW system 14. In addition, each track augment of the plurality of track augments 20 defines a plurality of augment variations 22 from first and second augment variations 22A, 22B to a finite number of augment variations 22N. The plurality of augment variation 22 Each augment variation in the plurality of augment variations 22 is independent and different from each augment variation of the plurality of augment variations 22, which is described in more detail below.

In the illustrated embodiment, the tracking framework 12A includes a single track augment 20. While the illustrated embodiment includes a single track augment for the tracking framework 12A, a skilled artisan may include any number of track augments in a tracking framework. Example numbers of track augments in a tracking framework include one track augment, at least one track augment, a plurality of track augments, two track augments, three track augments, or any suitable number of track augments for a particular application of a tracking framework implemented into a fixed EW system, such as EW system 14. Such inclusion of additional track augments 20 in the tracking framework 12A is described in more detail below.

Moreover, the track augment 20 includes first and second augment variations 22A, 22B in the plurality of augment variations 22. While the illustrated embodiment includes the plurality of augment variations 22 for the track augment 20, a skilled artisan may include any number of augment variations in a track augment. Example numbers of augment variations for in a track augment include one track augment variation, at least one track augment variation, a plurality of track augment variations, two track augment variations, three track augment variations, or any suitable number of augment variations for a particular application of a track augment in a tracking framework implemented into a fixed EW system, such as EW system 14. Such inclusion of additional track variations 22 in a track augment 20 is described in more detail below.

In the modular EW 12, the logic framework 12B is associated with the tracking framework 12A such that the logic framework 12B can communicate with the tracking framework 12A to receive a second set of objects from the tracking framework 12A and act upon said second set of objects by further augmenting or refining the second set of objects, which is described in more detail below. As illustrated in FIG. 1, the logic framework 12B defines a logic component 18. The logic component 18 includes a plurality of process components 24 that is invoked upon by the logic component 18 once the second set of objects are received from the track component 16. The process component 24 in the illustrated embodiment is the interface for a user, such as a system developer, for interacting with each logic component 18. Each process component in the set of process components 24 provides a process and/or a method onto the augmented data that is outputted from the track component 16 of the tracking framework 12A. The process and/or method implemented into each process component of the plurality of process components 24 may further augment and/or refine the augmented data that is outputted from the track component 16 of the tracking framework 12A. The process component 24 defines a plurality of process variations 26 from first and second process variations 26A, 26B to a finite number of process variations 26N. Each process variation in the plurality of process variations 26 is independent and different from each process variation of the plurality of process variations 26 due to each process variation having an alternative method and/or process.

In the illustrated embodiment, the logic framework 12A includes a single process component 24. While the illustrated embodiment includes a single process component 24 for the logic framework 12B, a skilled artisan in this art may include any number of process components in a logic framework. Example numbers of process components in a logic framework include zero process components, one process component, at least one process component, a plurality of process components, two process components, three process components, or any suitable number of process components for a particular application of a logic framework implemented into a fixed EW system, such as EW system 14. Such inclusion of additional process components 24 in the logic framework 12B is described in more detail below.

Furthermore, while the illustrated embodiment includes first and second process variations 26A, 26B for the process component 24, a skilled artisan in this art may include any number of process variations in a process component. Example numbers of process variations included in a process component include one process variation, at least process variation, a plurality of process variation, two process variations, three process variations, or any suitable number of process variations in a process component for a particular application of a logic framework implemented into a fixed EW system, such as EW system 14. Such inclusion of additional process variations 26 in a single process component 24 is described in more detail below.

Having now described the structure of system 10 and the various components and connections thereof within system 10, a method of use thereof will now be described.

In the illustrated embodiment, the EW system 14 in system 10 operates under executable codes (i.e., methods) and continually gathers data (i.e., fields that have certain attributes or properties) from at least one sensor unit configured in the EW system 14 during a specified runtime. The executable codes and the data gathered from at least one sensor unit in the EW system 14 are independent from any and all executable codes and gathered data modified in the modular EW 12. In other words, the existing executable codes and gathered data in fixed EW system 14 are unaffected when the modular EW 12 is implemented into and operates with the fixed EW system 14. Furthermore, the modular EW 12 can be implemented into any fixed EW system 14 since the modular EW 12 is platform-agnostic. In other words, the modular EW 12 can interact with any platform with any preexisting and/or modern fixed EW hardware or firmware installed and/or implemented in a given electronic warfare vehicle. Such capability is considered advantageous at least because the modular EW 12 can extract specific executable codes and gathered data from a first fixed EW system, such as fixed EW system 14, and implement such executable codes and gathered data, either non-modified or modified executable codes and gathered data, into a second, different fixed EW system to leverage the second, different fixed EW system's capabilities and functions. Such advantages are described in more detail below.

Figure 2B:
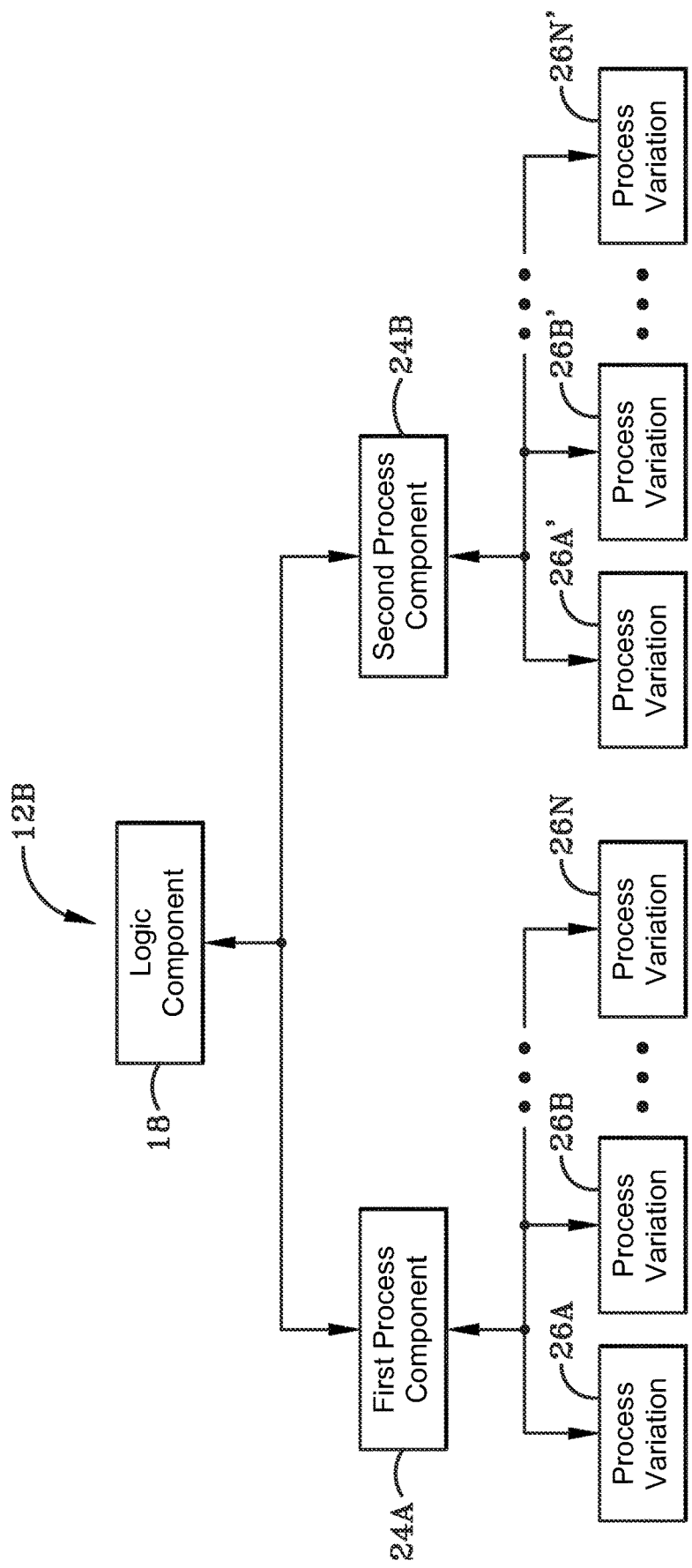
FIG. 2B illustrates an alternative block diagram of the logic framework shown in FIG. 1.

As illustrated in FIGS. 1 through 2B, the modular EW 12 defines an object-oriented framework for each of the tracking framework 12A and the logic framework 12B to help leverage the fixed EW system 14 to another fixed EW system. The modular EW 12 implements a blend of a decorator design pattern and a strategy design pattern together, which simplifies both the extensibility of the modular EW 12 on a single platform and allows for the re-use of EW systems across different platforms. In the illustrated embodiment, the tracking framework 12A in the modular EW 12 implements the decorator design pattern, and the logic framework 12B in the modular EW 12 implements the strategy design pattern. The blend of the decorator and strategy design patterns together in the modular EW 12 is considered advantageous at least because this blend of design patterns provides a user with the capabilities of augmenting certain gathered data received from fixed EW system 14 and implementing specific processes based on the information received from the EW system 14 in the same electronic warfare architecture.

As for the decorator pattern, the tracking framework 12A allows a user to add or augment behavior to an individual object through each track augment in the plurality of track augments 20 without affecting other objects received by other track augments in the plurality of track augments 20 in the tracking framework 12A. For example, the track component 16 may invoke first and second track augments in the plurality of track augments 20 in the tracking framework 12A based on the first set of objects outputted by the fixed EW system 14. The first track augment in the plurality of track augments 20 may organize or augment the first set of objects through its plurality of augment variations 22 based on the designed behavior of the first track augment and the plurality of variations of the first track augment (e.g., organizing or augmenting radio frequency, geolocation, etc.). The second track augment in the plurality of track augments 20 may organize or augment the metadata from the first set of objects received by the first track augment of the plurality of track augments 20 through its plurality of augment variations 22. As such, each of the first and second track augments in this example are unaffected by the organization or augmentation performed in each respected track augment in the plurality of track augments 20. The result of such organization and augmentation by the plurality of track augments 20 will output a second set of objects that is different than the first set of objects outputted by the fixed EW system 14, which is described in more detail below.

As for the strategy pattern, the logic framework 12B allows a user to integrate certain processes and/or methods into the plurality of process components 24 in which the logic component 18 may invoke specific process components of the plurality of process components 24 during runtime to analyze the second set of objects outputted by the track component 16. Upon analyzing, each invoked process component of the plurality of process components 24 makes a determination based on the received second set of objects on whether an invoked process component may execute its designed process and/or method. For example, the logic component 18 may invoke first and second process components in the plurality of process components 24 in the logic framework 12B based on the second set of objects outputted by the track component 16. The first process component in the plurality of process components 24, along with its plurality of process variations 26, will analyze the second set of objects based on a first criteria. The second process component in the plurality of process components 24, along with its plurality of process variations 26, will look at the second set of objects based on a second criteria. For example, the first criteria of the first process component may include a process called "Calculate Priority" and is assigned a track augment called "Priority." The second criteria of the second process component may include a process called "Calculate pulse repetition interval ("PRI")" and is assigned a track augment called "PRI". Prior to the execution of the first and second processes, the first process may search for a "priority" augment and the second process may search for a "PRI" augment. Each of the first and second process components of the plurality of process components 26 will then make an individual determination on whether it may execute its process and/or method based on the "priority" or "PRI" augment. If execution is possible, each of the first and second process components of the plurality of process components 26 will run its process and/or method along with its varied processes and/or methods implemented into its plurality of process variations 26. The result of such executions by the plurality of process components 24 will output a third set of objects that is different than the first and second sets of objects outputted by the fixed EW system 14 and the track component 16, which is described in more detail below.

Upon implementation of the modular EW 12, the modular EW 12 receives the executable codes and gathered data outputted from the fixed EW system 14, which are collectively based in a first set of objects. With this, the first set of objects from the fixed EW system 14 enters into the tracking framework 12A of the modular EW 12 and is sent to the track component 16. As illustrated in FIG. 1, the track component 16 invokes the track augment 20 upon receiving the first set of objects. Here, the track augment 20 receives the entire first set of objects from the fixed EW system 14 given the tracking framework 12A in this exemplary embodiment includes a single track augment 20. In alternative embodiments, such as the embodiment illustrated in FIG. 2A, the modular EW 12 may include more than one track augment 20 (e.g, first and second track augments 20A, 20B) in which a selected object of the first set of objects would enter into either a first track augment 20A or a second track augment 20B rather than a single tracking augment 20 as illustrated in FIG. 1. As provided above, each of the first and second track augments 20A, 20B may augment certain objects based on its instructed behaviors, as implemented by the user, without affecting other objects received by other track components, which is described above. Additionally, the modular EW 12 can include any suitable amount of track augments with different augment behaviors based on a particular application of the modular EW 12 implemented into a fixed EW system with associated hardware and/or firmware.

As illustrated in FIG. 2A, the alternative tracking framework 12A includes the first track augment 20A and the second track augment 20B. Each of the first and second track augments 20A, 20B is similar to the track augment 20 illustrated in FIG. 1 and described above. Indeed, the first track augment 20A includes a first and second augment variations 22A, 22B to a finite number of augment variations 22N. Similarly, the second track augment 20B includes first and second augment variations 22A', 22B' to a finite number of augment variations 22N'. In this embodiment, each of the first and second track augments 20A, 20B is different from each other. In addition, each of first and second augment variations 22A, 22B to a finite number of augment variations 22N in the first track augment 20A is different from each other. Similarly, each of first and second augment variations 22A', 22B' to a finite number of augment variations 22N' in the second track augment 20B is different from each other. As such, the augment variations of the first track augment 20A are different than the augment variations of the second track augment 20B.

Prior to the track augment 20 of the track component 16 receiving a specified object of the first set of objects from the fixed EW system 14, a user may assign certain behaviors, dynamically, into the track augment 20 to act upon the first set of objects outputted from the fixed EW system 14 without affecting the executable code or gathered data in other objects. Such behaviors of the track augment 20 are included into the plurality of augment variations 22 where each augment variation of the plurality of augment variations 22 may add, augment, or organize an object in the first set of objects differently than another augment variation in the plurality of augment variations 22. For example, a first augment variation 22A of the plurality of augment variations 22 may act upon a first parameter in the object (e.g., radio frequency) from a first sensor unit included in the fixed EW system 14, and a second augment variation 22B of the plurality of augment variations 22 may act upon a second, different parameter in the object (e.g., geolocation) from a second sensor unit included in the fixed EW system 14. In addition, each augment variation of the plurality of augment variations 22 in a track augment 20 is executed on a multi-core computer processor (not illustrated). Such execution on a multi-core computer processor allows each augment variations 22 of the track augment 20 to be executed on a core such that each augment variation 22 is executed in parallel during operation.

In the illustrated embodiment, the track augment 20, with its associated plurality of augment variations 22, may be modified by a user prior to or after receiving the data outputted by the fixed EW system 14 to act upon the object. In other examples, the track augment 20 can be modified by other means, such as artificial intelligence (AI) or neural networks, included in the track augment of each track component of the set of track components 16. Furthermore, the plurality of augment variations 22 may include augment operations that modify and/or enhance certain attributes or properties of the data in each object that is sent from the fixed EW system 14. Such enhancement by the track augment 20 is considered advantageous at least because the augmented data accomplished by the plurality of augment variations 22 may be integrated into a different, separate fixed EW system for leveraging the different, separate fixed EW system components.

In the current embodiment, each of the tracking framework 12A and the logic framework 12B are associated with each other in the modular EW 12. In other words, each of the tracking framework 12A and the logic framework 12B are linked to each other or combined logically within the blend of the decorator and strategy design patterns. Such an association between each framework 12A, 12B allows a flow of information from the tracking framework 12A to the logic framework 12B and from the logic framework 12B to the tracking framework 12A. Furthermore, each of tracking framework 12A and logic framework 12B may communicate via an open standard messaging infrastructure in the modular EW 12.

Once the assigned augmentation of each augment variation of the plurality of augment variations 22 is complete, the results are outputted to each respected track augment 20 in the aggregate and then outputted to the track component 16 as a second set of objects. The second set of objects outputted by the track component 16 of the tracking framework 12A may be received by the logic framework 12B if the modular EW 12, as developed by a user, includes a logic framework 12B. If, however, the modular EW 12 is developed without a logic framework 12B, the information will be outputted to the track component 16 of the tracking framework 12A.

In one exemplary embodiment, the logic framework 12B receives the second set of objects from the tracking framework 12A. In FIG. 1, the second set of objects enters into the logic framework 12B of the modular EW 12 and is sent to the logic component 18. In the illustrated embodiment, the logic component 18 invokes the plurality of process components 24 upon receiving the second set of objects from the track component 16 of the tracking framework 12A. Since the logic framework 12B only includes a single process component 24 in this exemplary embodiment, the logic component 18 may only invoke the single logic component 24 to receive the entire outputted data from the tracking framework 12A, such as the second set of objects. In alternative embodiments, such as embodiment illustrated in FIG. 2B, the modular EW 12 may comprise of more than one process component 24 (e.g, process components 24A, 24B) in which the entire second set of objects from the tracking framework 12A would enter into each process component 24A, 24B rather than a single process component 24. Each of the first and second process components 24A, 24B may be separately invoked by the logic component 18 based on process and/or methods implemented into each of the first and second process components 24A, 24B. As described above, the modular EW framework 12 can be include any suitable amount of process components 24 based on a particular application of the modular EW framework 12 with fixed EW hardware and/or firmware.

As illustrated in FIG. 2A, the alternative logic framework 12B includes the first process component 24A and the second logic component 24B. Each of the first and second process components 24A, 24B is similar to the process component 24 illustrated in FIG. 1 and described above. As such, the first process component 24A includes first and second process variations 26A, 26B to a finite number of process variations 26N. Similarly, the second process component 24B includes first and second process variations 26A', 26B' to a finite number of process variations 26N'. In this exemplary embodiment, each of the first and second process components 24A, 24B is different from each other. In the first process component 24A, each of first and second process variations 26A, 26B to a finite number of process variations 26N comprises of a different determination from each other. Similarly, in the second process component 24B, each of first and second process variations 26A', 26B' to a finite number of process variations 26N' comprises of a different determination from each other. As such, the process variations of the first process component 24A are different than the process variations of the second process component 24B.

Prior to each process component in the plurality of process components 24 receiving the data from the tracking framework 12A, a user, such as a system developer, may implement a process and/or method into each process component 24 of the plurality of process components 24. Once this process and/or method is implemented into each process component in the plurality of process components 24, each process component in the plurality of process components 24 determines whether it can be executed based on the second set of objects outputted by the track component 18. If a process component in the plurality of process components 24 determines that the execution of the process/method may not be performed, the process component in the plurality of process components 24 does not return a result. If, however, a process component in the plurality of process components 24 determines that the execution of the process/method may be performed, the process component in the plurality of process components 24 does output a result, which is described in more detail below. In addition, the process and/or method implemented into each process component of the plurality of process components 24 is included in the plurality of process variations 26 where each process variation of the plurality of process variations 26 is instructed by the process component 24 to further augment or refine the second set of objects. Each process variation of the plurality of process variations 26 may be instructed to further augment or refine the second set of objects differently than another process variation in the plurality of process variations 26.

In an exemplary embodiment, a first process variation 26A of the plurality of process variations 26 may be instructed by the process component 24 (i.e., a scheduling criteria) of the logic component 18 (e.g., a system priority aggregator) to run a first process variation (i.e., a tasked priority) onto the second set of objects outputted by the tracking framework 12A. In addition, a second process variation 26B of the plurality of process variations 26 may be instructed by the process component 24 to run a second process variation (i.e., assessed pulse descriptor words (PDWs)) onto the second set of objects outputted by the tracking framework 12A. As such, each of the first process variation 26A and the second process variation 26B further augments or refines the second set of objects based on the assigned process variations. In addition, each process variation of the plurality of process variations 26 is executed on a multi-core computer processor (not illustrated). Such execution on a multi-core computer processor allows each process variations 26 of the process component 24 to be executed on a core such that each process variations 26 is executed in parallel during operation.

Once each process variation of the plurality of process variations 26 completes its assigned process and/method variation, the further augmented or refined second set of objects is aggregated and outputted to each process component of the plurality of process components 24. Each process component of the plurality of process components 24 then outputs the further augmented or refined second sets of objects to the logic component 18, which defines a third set of objects. The third set of objects is different from that of the first and second sets of objects outputted by each of the fixed EW system 14 and the track component 16 of the tracking framework 12A. The third set of objects outputted by the logic component 18 can be used to leverage the fixed EW system 14 or another, different fixed EW system.

In this embodiment, the process component 24, with its associated plurality of process variations 26, may be modified by a user prior to or after receiving the objects outputted by the tracking framework 12A. In other examples, the process component 24 can be modified by other means, such as artificial intelligence (AI) or neural networks, included in the process component 24 of each process component of the set of logic components 18. Such modification by the process component 24 is considered advantageous at least because a user, such as a system developer, may modify a selected process during testing and implementation while not modifying any existing executable code on the fixed EW hardware/firmware. Furthermore, this logic framework 12A may be outputted into a different, separate fixed EW system for leveraging the different, separate fixed EW system components. Such leveraging is described in more detail below.

In an alternative embodiment, the modular EW 12 may omit either the tracking framework 12A or the logic framework 12B based upon a particular application of the modular EW framework 12 with a fixed EW system 14. If an alternative embodiment omits the tracking framework 12A, the entire set of data collected by the fixed EW system 14 would be outputted to the logic framework 12B and bypass any organization or modification originally performed by the tracking framework 12A. If an alternative embodiment omits the logic framework 12B, the entire set of data collected by the fixed EW system 14 would be outputted to the tracking framework 12A and bypass any validations originally performed by the logic framework 12B.

Having described the components and elements of the modular EW framework 12 with the fixed EW system 14, an exemplary embodiment of using the modular EW framework 12 with the fixed EW system may now be described.

In an exemplary embodiment, a modular EW framework, such as modular EW framework 12, receives a set of pulse descriptor words ("PDWs") outputted from a fixed EW system, such as fixed EW system 14. In this exemplary embodiment, set of PDWs outputted from the fixed EW system is sent to a tracking framework, such as tracking framework 12A. The set of PDWs received by the tracking framework from the fixed EW system is then organized into a track information augment via a track augment and any associated track variations, such as track augment 20 and augment variations 22, where the set of PDWs is affixed to the "track object."

In addition, the modular EW framework in this exemplary embodiment includes a logic framework, such as logic framework 12B. The logic framework and the tracking framework are attached in parallel to the modular EW framework. The logic framework includes a set of process components, such as process components 24. In this exemplary embodiment, the set of processes components defines a first process component and a second process component. The first process component provides the capability of calculating signal to noise ratio ("SNR") in the logic framework. The second process component provides the capability of calculating pulse repetition interval ("PRI") in the logic framework. The logic framework processes the "track object" augmented by the tracking framework by executing the first and second processes. Such execution of the first and second processes by the logic framework may be performed asynchronously. Upon execution, the first process in the logic framework, which calculates the SNR, generates a new augment by affixing the SNR calculation to the track object. Similarly, the second process in the logic framework, which calculates the PRI, also generates a new augment by affixing the PRI calculation to the track object. As such, the track object has now been refined and updated with an SNR calculation and PRI calculation via the logic framework.

Figure 3:
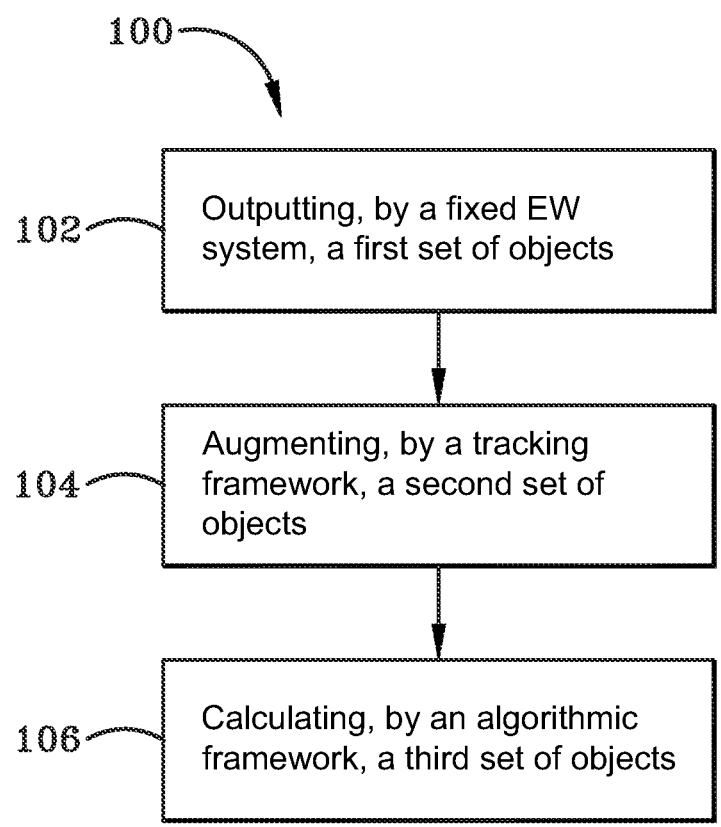
FIG. 3 is an exemplary method flow chart for leveraging a fixed electronic warfare (EW) system with a modular EW framework.

FIG. 3 illustrates an exemplary flow chart that provides a method 100 for leveraging a fixed electronic warfare (EW) system with a modular electronic warfare (EW) application framework. Initial step 102 includes outputting, by a fixed electronic warfare (EW) system having an executable code and at least one sensor unit gathering data, a first set of data. Step 104 includes augmenting, by a tracking framework, the set of collected data with a predetermined parameter to obtain a second set of data. Step 106 includes augmenting, by a logic framework, the second set of data with a predetermined process to obtain a third set of data.

Steps 104 may include an additional step where a multi-core processor executes the augmenting of the first set of objects for the tracking framework to output the second set of objects. Similarly, step 106 may include an additional step where the multi-core processor executes the augmenting of the second set of objects for the logic framework to output the third set of step. In addition, step 106 may be omitted from the method if the modular EW application does not include a logic framework.

In an exemplary embodiment, a method, such as method 100, may include a fixed EW system and a modular EW framework. The fixed EW system provides a set of radiofrequency data ("RF data"), such as pulse descriptor words ("PDWs"), as objects. These objects are a fundamental part of the fixed EW system. As such, the objects are outputted to the tracking framework of the modular EW system and then to the logic framework. The tracking and logic framework may collectively provide the additional data set for refined and updated EW information regarding the RF data. Such refinement and updates can be performed on the RF data because the tracking and logic framework are attached in parallel in the modular EW framework. In addition, the exemplary embodiment of the method for this modular EW framework is used to retrofit to the fixed EW system using only process and/or method modifications.

The implementation of the modular EW framework 12 into the fixed EW hardware and firmware, such as fixed EW system 14, is considered advantageous at least because the modular EW framework 12 is added onto the fixed EW system 14 without modifying any of the fixed EW hardware or firmware. Once the modular EW framework 12 receives the executable codes and the gathered data from the existing EW hardware or firmware, the modular EW framework 12 organizes and/or modifies the executable codes and the gathered data separately and in isolation from the fixed EW hardware or firmware during operation and/or testing. As such, the implementation of the modular EW framework 12 provides users with the capabilities to alter and/or implement additional criteria or properties into the fixed EW hardware or firmware while not disturbing the current executable programs installed in the fixed EW hardware or firmware. This lack of disturbance allows for a reduction in time for testing and developing updates for fixed EW hardware or firmware while maintaining a low risk of error, low costs for testing and developing potential process updates, and more efficient integration of EW processing framework into the fixed EW hardware and/or firmware.

As discussed previously, the modular EW framework 12 is platform-agnostic. The capability of having the modular EW framework 12 being platform-agnostic is considered advantageous at least because the modular EW framework 12 can be implemented into any preexisting or future fixed EW hardware and/or firmware. This capability eliminates the need for updating fixed EW hardware and/or firmware with a corresponding platform software update, which would traditionally incur higher costs and greater amounts of time for developing each of the software, firmware, and hardware together. In essence, the modular EW framework 12 leverages and/or enhances the preexisting fixed EW hardware/firmware without completely redesigning and redeveloping an EW system. Furthermore, the modular EW 12 is not limited to the implementation of a single programming language or packaging structure (e.g., containers). Such implementation into different programming languages or packaging structures is considered advantageous at least because the modular EW framework can support effective EW system implementation across the broadest suit of available computer processing units (CPUs) and operating systems offered in the current market.

In the illustrated embodiments, modular EW framework 12 can help leverage preexisting data and information between different EW systems. The capability of leveraging such data and information is considered advantageous at least because the modular EW framework 12 can utilize data and information from a first EW entity and implement said data and information to leverage a second, different EW entity. For example, the leveraging capability allows for the modular EW framework 12 to extract information from a first, newer EW entity and implement certain pieces of extracted information into the second, older EW entity to, in essence, enhance the capabilities of the second, older EW entity. As such, this capability allows for older EW entities to utilize newer and updated capabilities without modifying or changing to new EW hardware or firmware as required by conventional EW systems in the current art.

In the illustrated embodiments, each of the tracking framework 12A and the logic framework 12B of the modular EW framework 12 is asynchronous. The capability of having each of the tracking framework 12A and the logic framework 12B be asynchronous is considered advantageous at least because users of the modular EW framework may develop and/or modify either the tracking framework 12A or the logic framework 12B at different time intervals during the development and/or testing stages. Furthermore, the asynchronous capability of each of the tracking framework 12A and the logic framework 12B are independent of each other. In essence, any modifications or changes performed by a user to one framework fails to affect the other framework. For example, if a user modifies the tracking framework 12A in the modular EW framework 12, the logic framework 12B in the same modular EW framework is unaffected and vice versa. Moreover, the asynchronous capability provides flexible scheduling and timing for users to modify a framework in the modular EW framework 12 without being dependent upon other users. As such, the asynchronous capability of the modular EW framework 12 increases development efficiency along different portions of the modular EW framework 12 at different times, which ultimately reduces costs and expenses when updating software across fixed EW hardware and firmware. Furthermore, the asynchronous capability allows users to scale the amount of processing nodes that are available on a fixed EW system for multiple micrologic components. Such scaling in the modular EW framework 12 decreases the risk of errors and issues when scaling the software from a small form factor EW system to a much larger, complex form factor EW system.

In the current embodiments, each component and/or process in the modular EW framework 12 communicates via an open standard messaging infrastructure. Such an open standard messaging infrastructure allows for ease of adding certain capabilities and other information into the modular EW framework 12 at a reduced cost and without modifying existing executable code in the fixed EW hardware and/or firmware 14. In addition, the modular EW framework 12 may utilize any suitable open standard messaging infrastructure. Examples of open standard messaging infrastructure for use in a modular EW framework include DDS, Nanomsg, ZeroMQ, RPC, HTTP/REST, and other suitable open standard messaging infrastructure for use in a modular EW framework based upon a particular application.

In the current embodiments, the modular EW framework 12 is a cyber-resilient architecture. In one exemplary embodiment, each process component in the plurality of process components 24 and each track augment of the plurality of track augments 20 may include an individual nature with the ability to apply suitable protection schemes at various and appropriate levels of security. In addition, since the modular EW framework 12 itself is cyber-resilient, the modular EW framework 12 is protected from access by the actual EW components such that access is protected within the interfaces of each process component in the plurality of process components 24 and/or each track augment of the plurality of track augments 20. The cyber-resilient architecture of the modular EW framework 12 is considered advantageous at least because each component included in the modular EW framework 12 (i.e., each component included in the tracking framework 12A and the logic framework 12B) is isolated individually to provide ample opportunities to protect each component if so desired by a user. Moreover, the protection for each component included in the modular EW framework 12 is sensitive and specific to the requirements implemented by a user for a particular application of the modular EW framework 12. As such, the cyber-resiliency prevents unauthorized third-parties from accessing the modular EW framework during runtime in a fixed EW system, such as fixed EW system 14.

The modularity of the modular EW 12 is considered advantageous at least because the modular EW 12 provides and contributes to an upgrade to the fixed EW system's 14 capabilities and functionality. While the modular EW 12 does "add-on" additional components to the fixed EW system 14, the modular EW 12 replaces the fixed EW system 14 with new refinements and updates. In other words, the modularity of the modular EW 12 allows a user to integrate the modular EW 12 into any fixed EW system, such as fixed EW system 14, to update, maintain, or expand upon any fixed EW system for any suitable reason (e.g., archaic methods and/or processes, etc.).

The computer processor described herein is a physical computer processing unit. While the computer processor has been stated as a multi-core computer processor, the computer processor may be a single core. In addition, the computer process is not inherent to the modular EW 12, but rather the modular EW 12 is able to utilize the computer process. In one exemplary embodiment, the modular EW 12 is able to utilize a computer processor with a single core. In another exemplary embodiment, the modular EW 12 is able to utilize a computer processor with multiple cores and execute along multiple cores. In another exemplary embodiment, the modular EW 12 is able to utilize multiple computer processor with a single core or multiple cores and execute along those computer processors dynamically.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or an embedded processor utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or embedded processors may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in fixed computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on fixed technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A system, comprising:
a fixed electronic warfare (EW) system having an executable code and at least one sensor unit configured to gather a set of data, wherein the executable code and the set of data collectively define a first set of objects;
a modular EW framework configured to extract the first set of objects from the fixed EW system and to modify the first set of objects with at least one parameter, wherein the modular EW framework outputs a second set of objects based on modification of first set of objects with the at least one parameter; and
a processor configured to execute the at least one parameter to output the second set of objects;
wherein the first set of objects in the fixed EW system remains unaffected within the fixed EW system, and wherein the first set of objects is different than the second set of objects.

2. The system of claim 1, further comprising:
a tracking framework defined by the modular EW framework, wherein the tracking framework extracts the first set of objects from the fixed EW system, and wherein the tracking framework augments the first set of objects with the at least one parameter and outputs the second set of objects.

3. The system of claim 2, further comprising:
a logic framework defined by the modular EW framework, wherein the logic framework receives the second set of objects from the tracking framework, and the logic framework implements at least one process onto the second set of objects and outputs a third set of objects.

4. The system of claim 2, further comprising:
a track component including a track augment, wherein the track component is defined by the tracking framework.

5. The system of claim 4, wherein the track augment defines a plurality of augment variations; and
wherein each augment variation of the plurality of augment variations has a different augment variation for augmenting the first set of objects.

6. The system of claim 3, further comprising:
a logic component including a process component, wherein the logic component is defined by the logic framework.

7. The system of claim 6, wherein the process component defines a plurality of process variations; and
wherein each process variation of the plurality of process variations has a different process variation for implementing the at least one process onto the second set of objects.

8. The system of claim 5, further comprising:
wherein the processor is a multi-core processor configured to execute each augment variation of the plurality of augment variations in parallel with each other on different cores of the multi-core processor.

9. The system of claim 7, further comprising:
wherein the processor is a multi-core processor configured to execute each process variation of the plurality of process variations in parallel with each other on different cores of the multi-core processor.

10. The system of claim 3, wherein the tracking framework and the logic framework are asynchronously.

11. The system of claim 1, wherein the modular EW framework is platform-agnostic.

12. A system, comprising:
a fixed electronic warfare (EW) system having an executable code and at least one sensor unit configured to gather a set of data, the executable code and the set of data collectively define a first set of objects;
a modular EW framework having a tracking framework and a logic framework;
the tracking framework extracts the first set of objects from the fixed EW system, and wherein the tracking framework augments the first set of objects with the at least one parameter and outputs the second set of objects;
the logic framework receives the second set of objects from the tracking framework, and the logic framework implements at least one process onto the second set of objects and outputs a third set of objects; and
a processor configured to execute the at least one parameter to output the second set of objects, the processor configured to execute the at least one process to output the third set of objects;
wherein the first set of objects in the fixed EW system remains unaffected within the fixed EW system, and wherein the first set of objects is different than the second and third sets of objects.

13. The system of claim 12, wherein the tracking framework defines a track component that includes a track augment.

14. The system of claim 13, wherein the track augment defines a plurality of augment variations; and
wherein each augment variation of the plurality of augment variations has a different augment variation for augmenting the first set of objects.

15. The system of claim 12, further comprising:
a logic component including a process component, wherein the logic component is defined by the logic framework.

16. The system of claim 15, wherein the process component defines a plurality of process variations; and
wherein each process variation of the plurality of process variations has a different process variation for implementing the at least one process onto the second set of objects.

17. The system of claim 14, further comprising:
wherein the processor is a multi-core processor configured to execute each augment variation of the plurality of augment variations in parallel with each other on different cores of the multi-core processor.

18. The system of claim 16, further comprising:
wherein the processor is a multi-core processor configured to execute each process variation of the plurality of process variations in parallel with each other on different cores of the multi-core processor.

19. The system of claim 12, wherein the tracking framework and the logic framework are asynchronous.

20. The system of claim 12, wherein the modular EW framework is platform-agnostic.

* * * * *